United States Patent
Veal et al.

(10) Patent No.: US 12,297,390 B2
(45) Date of Patent: *May 13, 2025

(54) TRINUCLEAR BASIC IRON (III) ACETATE SOLID ABSORBENT COMPOSITIONS AND METHODS FOR THE REMOVAL OR SWEETENING OF MERCAPTAN SULFUR COMPOUNDS FROM HYDROCARBON STREAMS

(71) Applicant: SM INTELLECTUAL TECHNOLOGIES LLC, La Porte, TX (US)

(72) Inventors: Jack Veal, Morgan, TX (US); Jefferey St. Amant, Stonewall, LA (US)

(73) Assignee: SM INTELLECTUAL TECHNOLOGIES LLC, La Porte, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/042,165

(22) PCT Filed: Aug. 19, 2020

(86) PCT No.: PCT/US2020/047062
§ 371 (c)(1),
(2) Date: Feb. 17, 2023

(87) PCT Pub. No.: WO2022/039739
PCT Pub. Date: Feb. 24, 2022

(65) Prior Publication Data
US 2024/0026230 A1   Jan. 25, 2024

(51) Int. Cl.
*C10G 25/02*          (2006.01)
*B01J 20/20*          (2006.01)
(Continued)

(52) U.S. Cl.
CPC .............. *C10G 25/02* (2013.01); *B01J 20/20* (2013.01); *B01J 20/223* (2013.01);
(Continued)

(58) Field of Classification Search
None
See application file for complete search history.

(56) References Cited

U.S. PATENT DOCUMENTS 11,000,825 B1 * 5/2021 Veal .................. B01J 20/28061
2006/0229476 A1  10/2006 Mitchell et al.
(Continued)

FOREIGN PATENT DOCUMENTS

EP     3080079 B1    7/2018

OTHER PUBLICATIONS

International Search Report and Written Opinion for International application No. PCT/US2020/047062, mailed May 13, 2021, 8 pages.
(Continued)

*Primary Examiner* — Tam M Nguyen
(74) *Attorney, Agent, or Firm* — Polsinelli PC

(57) ABSTRACT

Solid absorbent compositions and methods for the removal of mercaptan sulfur compounds from hydrocarbon streams are provided. The compositions may include porous granulated activated carbon particles with internal pore surfaces containing bound trinuclear basic iron (III) acetate complex containing the [Fe$_3$($\mu_3$—O)] core structure.

59 Claims, 6 Drawing Sheets

(51) Int. Cl.
  *B01J 20/22* (2006.01)
  *B01J 20/28* (2006.01)
  *B01J 20/32* (2006.01)
  *B01J 20/34* (2006.01)

(52) U.S. Cl.
  CPC ... *B01J 20/28004* (2013.01); *B01J 20/28061* (2013.01); *B01J 20/28064* (2013.01); *B01J 20/28073* (2013.01); *B01J 20/28076* (2013.01); *B01J 20/3204* (2013.01); *B01J 20/3236* (2013.01); *B01J 20/3265* (2013.01); *B01J 20/3475* (2013.01); *C10G 2300/202* (2013.01)

(56) References Cited

U.S. PATENT DOCUMENTS

| 2014/0099571 | A1* | 4/2014 | Proietti | H01M 4/9041 |
| | | | | 502/185 |
| 2018/0369769 | A1 | 12/2018 | Yaginuma | |
| 2022/0073353 | A1* | 3/2022 | Sundararaj | C09C 1/42 |

OTHER PUBLICATIONS

Turtle, K. I., et al., "Synthesis and Structure of Trinuclear Iron Acetate [Fe3O(CH3COO)6(H2O)3][AuCl4]·6H2O", Journal of Structural Chemistry, 2002, vol. 43, No. 1, pp. 108-117.

Abbasi, M. et al., "Aerobic Oxidation of Thiols and In Situ Generated Thiols to Symmetrical Disulfides (Disulfanes) Catalyzed by Na2S4O6", ChemistrySelect, 2019, vol. 4, pp. 12227-12231.

* cited by examiner $[Fe^{+3}{}_3(u-O)(oAc-)_6]$ Triangle Complex

Mercaptan Sulfur is Captured by Solid Media

Case 1: Treatment of Hydrocarbon Stream for Sulfur Removal

Hydrocarbon Stream Containing Sulfur Mercaptans

Hydrocarbon Stream with Sulfur Compounds Removed

Media with Chemical Bond Complex

Treatment Vessel

Mercaptan Sulfur Reacts with Solid Media to Form Disulfide

Case 2: Treatment of Hydrocarbon Stream for Sulfur Sweetening

Hydrocarbon Stream Containing Sulfur Mercaptans

Hydrocarbon Stream with Soluble Disulfide Oil

Media with Chemical Bond Complex

Treatment Vessel

FIG. 4

TRINUCLEAR BASIC IRON (III) ACETATE SOLID ABSORBENT COMPOSITIONS AND METHODS FOR THE REMOVAL OR SWEETENING OF MERCAPTAN SULFUR COMPOUNDS FROM HYDROCARBON STREAMS

CROSS-REFERENCE TO RELATED APPLICATIONS

This application claims priority to and is a national phase entry of PCT/US2020/047062 filed Aug. 19, 2020, the entire contents of which are incorporated by reference herein.

FIELD

The present disclosure is broadly concerned with compositions and methods for the removal of mercaptan sulfur compounds from hydrocarbon streams. In particular, the present disclosure is related to porous granulated activated carbon particles with internal pore surfaces containing bound trinuclear basic iron (III) acetate complex containing the [$Fe_3(\mu_3$—O)] core structure.

BACKGROUND

Sulfur containing compounds, such as mercaptans, are common components in hydrocarbons. However, polar mercaptan sulfur compounds are undesirable and hazardous due to their characteristic toxicity and corrosivity. Therefore, it is desirable to remove them from hydrocarbon streams or cause the reaction of the mercaptan sulfur compounds to form other less toxic and corrosive compounds.

The United States Environmental Protection Agency (EPA) along with other federal, state and local agencies have historically developed policy and enforcement standards for the reduction of pollutants from air and water resulting from various processes. The authority of such derives from the Clean Air Act, Clean Water Act and subsequent legislative actions. Examples of such policy developments include the National Ambient Air Quality Standards (NAAQS), which defines the allowable air quality limits for compounds such as Volatile Organic Compounds, Oxides of Nitrogen, and Oxides of Sulfur, among other compounds.

Another such example is the EPA's Motor Vehicle Emission and Fuel Standards, otherwise referred to simply as Tier II and Tier III, which reduces the allowable content of sulfur in fuels such as diesel and gasoline. As a result of these regulatory directives, the removal/limiting of sulfur compounds from fuels which results in sulfur dioxide as well as the removal/limiting of sulfur compounds from water sources is a growing issue in the United States and within other developed and developing nations.

A number of conventional systems and processes are able to manage the concentrations of hydrogen sulfide and other sulfur compounds in various matrixes. For instance, one conventional method for removal of mercaptan sulfur utilizes patented processes commercially known as Merox treatment, where a catalyst is used in combination with a caustic phase to oxidize mercaptans to disulfides. Such conventional systems require multiple treatment process steps, are capital intensive, are more costly to operate and are not suited for short term or mobile applications. Other conventional methods, such as caustic extraction, are able to treat for certain highly reactive small sulfur compounds, such as hydrogen sulfide and methyl mercaptan (thiol), but are not very effective in the removal of larger mercaptans such as butyl or propyl mercaptan (thiols).

Accordingly, there is a need for a system and method that remedies one or more of the aforementioned deficiencies of conventional systems and processes for larger thiols, as well as having one or more advantageous characteristics, such as having flexible operation requirements, being consistently economical to operate, being operable to extract or sweeten R—SH (particularly mercaptan sulfur species, ethyl thiol, propyl thiol and butyl thiol, and their branched isomers and higher carbon number thiols when present) from natural gasoline, propane, butane, mixtures of propane and butane, light naphtha, heavy naphtha, kerosene/turbine fuel and other hydrocarbon fluids, thereby improving toxicity and corrosivity concerns, quality issues, resulting infrastructural concerns, salability, and/or usability of the product.

BRIEF DESCRIPTION OF THE DRAWINGS

In order to describe the manner in which the advantages and features of the disclosure can be obtained, reference is made to embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 depicts a system for the treatment of a hydrocarbon fluid containing mercaptan sulfur, according to an exemplary embodiment of the present disclosure;

BRIEF SUMMARY

Figure 1:
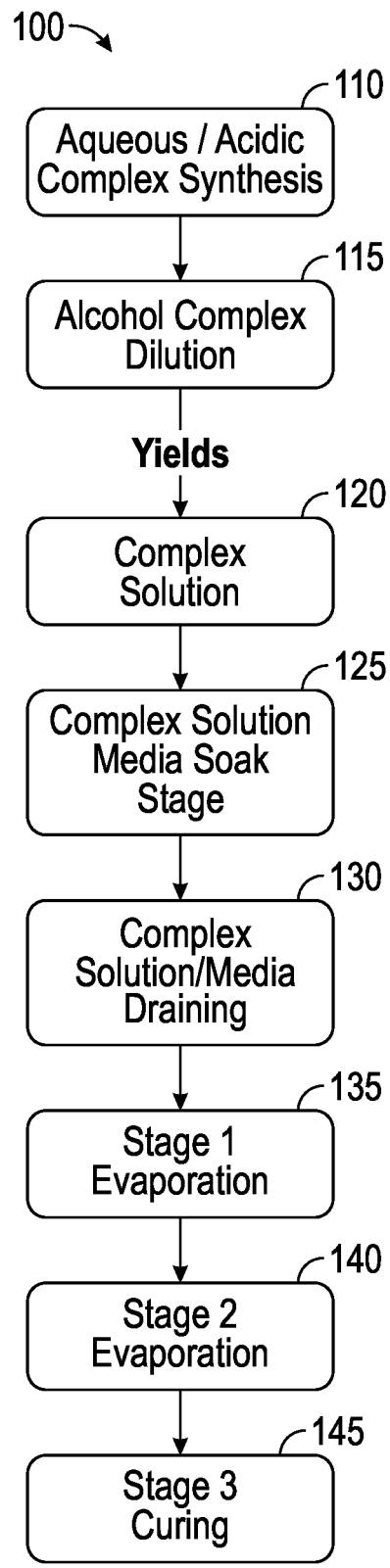
FIG. 1 is a flow diagram depicting the process for the synthesis of the bond complex, according to an exemplary embodiment of the present disclosure.

The present disclosure provides compositions and methods for the treatment hydrocarbon streams by the removal of mercaptan sulfur compounds. In particular, the presently disclosed compositions and methods may be useful in the field of extraction and sweetening of mercaptan sulfur (thiols) from hydrocarbon streams, aqueous liquids, and gases. The compositions may include porous solid substrates or solid absorbents, such as porous granulated activated carbon particles, with basic iron (III) acetate complex bonded to the internal surfaces of the porous solid substrate. In particular, the novel [$Fe_3(\mu_3$—O)] core structure of the basic iron (III) acetate complex is chemically bound to the surface of the porous solid substrate, and once bound retains its structure and chemical reactions related to mercaptan sulfur compounds, that are present within many hydrocarbon fluids.

The present disclosure also provides a method and system for the treatment, through extraction or sweetening, of mercaptan sulfur (R—SH) compounds, such as, but not limited to, methyl thiol, ethyl thiol, propyl thiol, butyl thiol, and higher carbon number thiols from natural gas, propane, butane, mixtures of propane and butane, natural gasoline, light naphtha and heavy naphtha, kerosene/turbine fuel and other hydrocarbon fluids.

According to another aspect of the present disclosure, a method of preparing a composition for the treatment of hydrocarbon streams and other streams comprising mercaptan sulfur species is provided. The method may include the preparation of a specific transition metal compound, basic iron (III) acetate anion complex, $[Fe_3(\mu\text{-}O)(OAc)_6(H_2O)_3]^+$, from iron (III) nitrate and glacial acetic acid in a aqueous solution. This core complex is known to be able to oxidize compounds, such as sulfur, without decomposition. Thus, one of the three Fe atoms is reduced to +2 and the complex, while now neutral, is still stable and the reduced $Fe^{+2}$ can be reoxidized to +3 with appropriate oxidant; for example, any one of the Fe atoms in the cluster stabilized by the ($\mu_3$—O) can undergo a REDOX cycle and stay intact, such that the solution uniformly fills and wets the pore surface and quantitatively distributes the complex within a media host such as acid washed activated carbon.

The present disclosure provides a novel process to remove the solvents such that the iron complex is chemically bound to the pore surface of the activated carbon and nitrate anion from the $Fe(NO_3)_3$ starting material is also removed from the complex coated activated carbon product. The solvent dried and complex bonded activated carbon is able to either retain (extraction) mercaptan sulfur compounds such as butyl mercaptan, or is capable of conversion (sweetening) of the mercaptan sulfur to a non-reactive disulfide hydrocarbon soluble sulfur species (process commonly known as sweetening within refinery operations). The unique feature of the solvent dried and complex bonded activated carbon is that it can extract and/or sweeten mercaptan sulfur directly from a continuous hydrocarbon phase being contacted with or passed through the pores of the complex bonded activated carbon; for example, extraction and sweetening without an aqueous caustic phase.

The bonded complex retains its REDOX properties.

It is understood that the core triangular tri-metal atom bound by the shared ($\mu_3$—O) atom can also be synthesized starting with iron (III) chloride, and that the complex can be formed utilizing carboxylic acids in addition to acetic acid. It is also understood the a Fe2/Co ($\mu_3$—O) mixed metal complex can be synthesized and bound to activated carbon by the process described above. These variations are also to be covered within the scope of the present disclosure, but the preferred product is formulated as described above utilizing iron (III) nitrate, glacial acetic acid and acid washed lignite based activated carbon.

DETAILED DESCRIPTION

It is to be understood that the present inventive concept is not limited in its application to the details of construction and to the embodiments of the components set forth in the following description or illustrated in the drawings. The figures and written description are provided to teach any person skilled in the art to make and use the inventions for which patent protection is sought. The present inventive concept is capable of other embodiments and of being practiced and carried out in various ways. Persons of skill in the art will appreciate that the development of an actual commercial embodiment incorporating aspects of the present inventive concept will require numerous implementations-specific decisions to achieve the developer's ultimate goal for the commercial embodiment. While these efforts may be complex and time-consuming, these efforts, nevertheless, would be a routine undertaking for those of skill in the art of having the benefit of this disclosure.

It will be appreciated that numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

The present disclosure provides the methods for formulating a specific aqueous/alcohol solution of a trinuclear iron (III) ($\mu_3$—O) acetate complex that can be distributed onto the internal pore surface of a porous solid media substrate followed by removal of the solvent (along with starting material impurities) and chemically bonding the intact complex on to that surface. The resulting product formulation and methods of using such material allows for the direct treatment of mercaptan sulfur compounds from hydrocarbon streams. The trinuclear iron (III) ($\mu_3$—O) complex that is bound to the substrate is the known Basic Iron (III) Acetate (CAS #1834-30-6) and is expressed by the formula $[Fe_3(\mu_3\text{—}O)(OAc)_6(L)_3][A]^{-1}$ where L is a trans neutral ligand and [Anion$^-$] is a counter ion when the complex is in solution. When in solution utilized in this method, the trans neutral ligand, L, will be one of the oxygen compounds present; either water, alcohol (such as ethanol), or acetic acid depending on relative solution concentrations, but which compound is in the "L" position is not critical to product chemistry. When in solution the charge balancing counter ion, [Anion$^-$], can be either acetate anion (OAc$^-$) or nitrate (NO$_3^-$). When the $[Fe_3(\mu_3\text{—}O)(OAc)_6(L)_3]$ complex is bound to the activated carbon surface the solution anion no longer has a role in the process chemistry and one of the "L" positions is utilized to create the pore surface bond holding the complex in place and connecting the $Fe_3(\mu_3$—O) triangle to the electron rich activated carbon surface.

Basic iron (III) acetate in the aqueous/alcohol complex solution is a soluble salt that is composed of the cation $[Fe_3(\mu_3\text{—}O)(OAc)_6(H_2O)_3]^+$ and an acetate anion (OAc or $CH_3CO_2^-$) or an anion from the Iron (III) starting material (either $NO_3^-$ or Cl$^-$). As the only role the anion has is to charge stabilize the solution. Accordingly, critical chemical formula of basic iron acetate is the soluble cation represented by the formula $[Fe_3(\mu_3\text{—}O)(OAc^-)_6(L)_3]^+$ where the trans neutral "L" is either $H_2O$ or OAcH. In most aqueous solution formulations it is assumed that the trans neutral ligand is water, but in our surface deposition and bonding the actual solution "L" is not critical to the oxygen species that occupies the "L" position on the two non-surface bonded Fe atoms in the $[Fe_3(\mu_3$—O)] core structure. Trinuclear Basic Iron (III) ($\mu_3$—O) Acetate complexes are reactive with polar ($S^{-2}$) sulfur due to its relatively unique $[Fe_3(\mu_3$—O)] core structure where the iron forms a triangle core complex with an equally shared oxygen molecule at its center. The acetate molecules chelate to the Fe atoms to form the 4-coordinate planar base for each Fe in the triangular structure. The central shared oxygen atom is the base out of plane ligand and the other (trans) out of plane position is occupied by an orbital with two unpaired Fe electrons. This allows each of the Fe atoms to accept and exchange ligands without covalent bonds. A property of the shared oxygen stabilized Fe cluster is that it can have at least one of the Fe atoms go through a +2/+3 redox cycle without destabilizing the [Fe$_3$($\mu_3$—O)] core structure of the molecule. This allows for the potential of using a sweetening type reaction to regenerate the iron complex bonded on to the granulated activated carbon particles pore surfaces.

The presently disclosed aqueous iron (III) acetate complex solution may be introduced into the pores within the media (GAC) utilizing an alcohol co-solvent blended with aqueous Iron (III) Acetate complex solution to create a mixture that provides uniform pore distribution of the solution and facilitates pore surface wetting. The alcohol co-solvent solution mixture is presented to the porous solid media through submerging the GAC particle in excess co-solvent solution and soaking over a sufficient time (e.g., 6-12+hrs) allowing the excess mixed solvent to displace air from pores and insure uniform dispersion into the inner pores of the porous solid media. The excess mixed solvent that is not retained in media pores is drained, recovered, and reused. The solvent mixture containing/solubilizing the complex is removed in two evaporative drying steps with specific temperatures and sweeping gas (air) rates. The first step selectively removes the bulk (90+%) of the alcohol with minimal aqueous removal. The second step removes the bulk aqueous phase under conditions of temperature and gas (air) sweeping rates such that the Basic Iron (III) Acetate complex [Fe$_3$($\mu_3$—O)(CH3CO2$^-$)$_6$(Ligand)$_3$]$^+$ is uniformly deposited and distributed on the pore surfaces. Also, the starting material anion (NO$_3^-$) is deposited on the GAC hydrogen deficient carbon surface of the inner pores. An additional thermal step is utilized to accomplish two critical chemistries; 1) thermally driven REDOX the (NO$_3^-$) with the carbon surface to yield gaseous NO$_2$ removing the potential anion impurity from the final product, and second to chemically bond one of the three Fe$_3$($\mu_3$—O) atom's to the inner surface of the porous activated carbon solid media through its trans "L" bonding site.

It has been unexpectedly discovered that trinuclear iron (III) ($\mu^3$—O) acetate complexes may be bond on the surface of granulated activated carbon particles such that the trinuclear iron (III) acetate complex maintains its [Fe$_3$($\mu_3$—O)] core structure and reactivity toward mercaptan sulfur compounds, when the presently disclosed compositions are prepared according to the presently disclosed methods and techniques. Further, the presently disclosed compositions are surprisingly characterized by stable binding between the granulated activated carbon particles and the trinuclear iron (III) ($\mu^3$—O) acetate complex solution, such that the bonded iron complex is not subject to removal by either hydrocarbon or aqueous solvents. Furthermore, the stable trinuclear iron (III) ($\mu_3$—O) acetate complex solution is capable of regeneration through oxidation of the reduced Fe atom following removal of any retained mercaptan sulfur compounds by conventional sweetening (conversion to non-iron binding hydrocarbon soluble disulfides) process chemistries.

FIG. 1 is a flow chart describing the process 100 for generating the presently disclosed composition for the treatment of hydrocarbon streams and other streams comprising mercaptan sulfur species, including the synthesis of the bond complex. At 110, the aqueous/acidic complex solution is synthesized. At 115, controlled dilution of the aqueous/acidic complex solution with alcohol is performed to yield the desired complex pore wetting and distribution solution mixture at 120. The target complex solution mixture typically has an alcohol concentration ranging from about 40% to 60%. At 125, selected porous media is exposed to sufficient complex solution from 120 to completely liquid fill the media's pore volume through submerging media and soaking for 6-12 hours. In at least some instances, the preferred media is acid washed lignite activated carbon. At 130, the inter-particle (excess) complex solution is drained and recovered from the media with the complex solution being retained within the media pores relative to the pore volume. Typically 40-50% of the soaking solution is retained within the media pores. At 135, stage one evaporative drying is performed in which the alcohol content of the complex solution retained in the pores is reduced by >90% with water removal controlled to be <10%. Stage two evaporation drying occurs at 140, in which removes the remaining aqueous phase by >90% as well as the excess acetic acid. Stage three curing occurs at 145, which results in the complex being surface bonded and nitrate is converted to nitrogen dioxide. After completion of the synthesis and product cooling, the composition is operable to retain mercaptan sulfur and sweeten hydrocarbon streams and other waste streams comprising mercaptan sulfur species.

Figure 2:
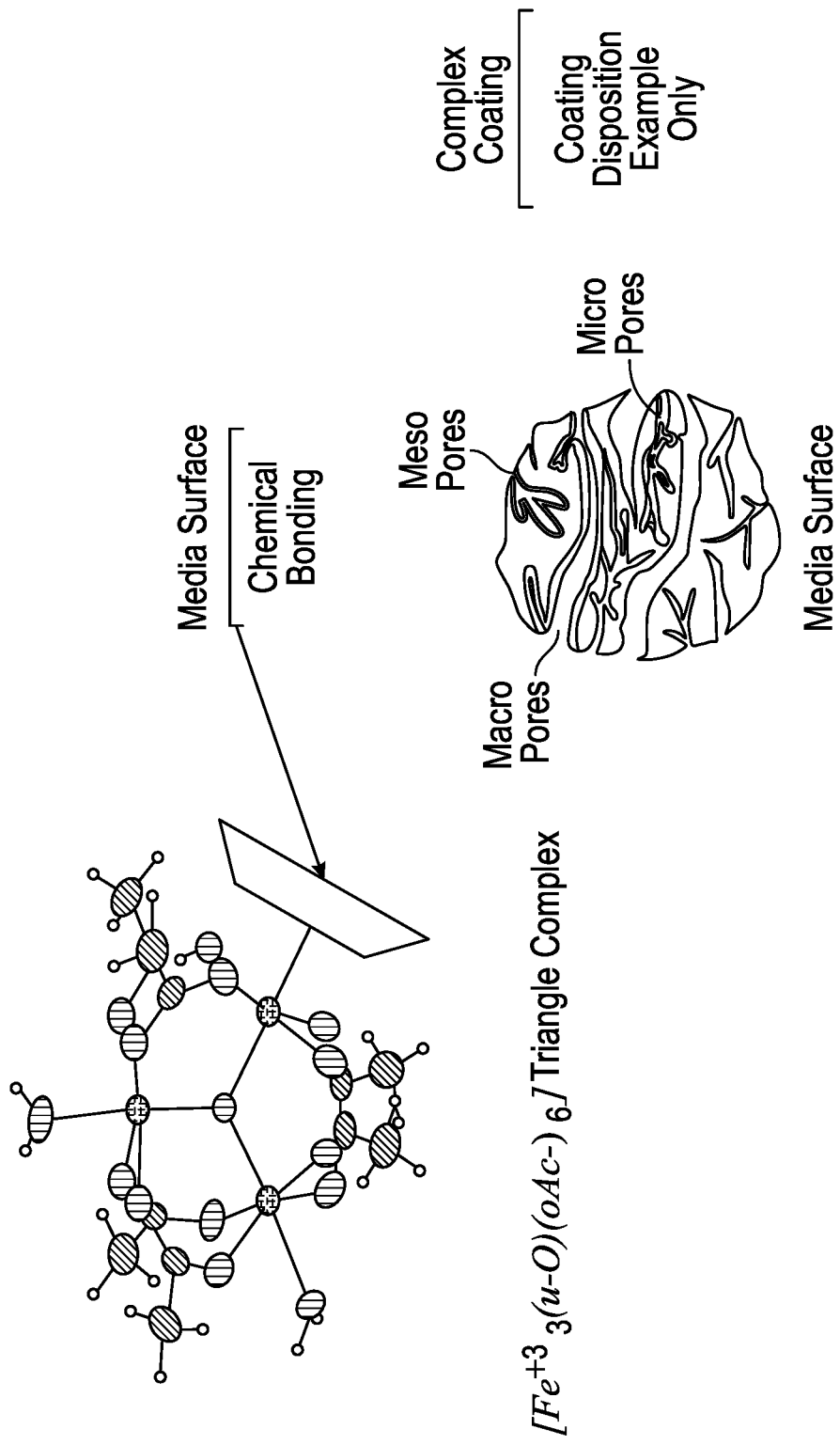
FIG. 2 depicts the 3-D chemical structure of the iron (III) acetate coordination complex chemically bound to a site on the surface of a solid absorbent, according to an exemplary embodiment of the present disclosure.

FIG. 2 depicts the 3-D chemical structure of the iron (III) acetate coordination complex [Fe$_3$O(OAc)$_6$(H$_2$O)$_3$]$^+$ (OAc is CH$_3$CO$_2^-$), commonly known as "basic iron acetate."

FIG. 2 also shows the iron (III) acetate coordination complex chemically bound to the internal surface of the selected solid media, utilizing the process synthesis depicted in FIG. 1 and described elsewhere in this disclosure. In particular, FIG. 2, depicts an example of the stable bond complex on the surface of the selected media, where it can be chemically bonded to the internal surface of the media pores, either or any of the Meso, Macro or Micro pores, or any combination of any of the surfaces of the media surface. In at least some instances, the selected porous solid media is acid washed lignite activated carbon from the lignite mines in Texas.

In at least one aspect of the present disclosure, the basic iron (III) acetate complex [Fe$_3$($\mu_3$—O)(CH3CO2$^-$)$_6$(Ligand)$_3$]$^+$[Anion]$^-$, may be synthesized using an iron salt selected from one of the hydrated iron (III) nitrate salts (Fe(NO$_3$)$_3$·nH$_2$O), preferably 9H$_2$O, as the starting material. In one such embodiment, the synthesis of the basic iron (III) acetate complex [Fe$_3$($\mu_3$—O)(CH3CO2$^-$)$_6$(Ligand)$_3$]$^+$[Anion]$^-$, can be carried out used other hydrated iron salts such as iron (III) chloride hexahydrate. It is further envisioned that iron salts other than nitrate could be utilized, but would require more complex preparation methods. The basic iron (III) acetate complex reagent solution may be formulated utilizing complex formula molar ratios of iron and acetic acid in aqueous solution at the desired concentration for formulation of alcohol co-solvent complex solution.

According to at least one aspect of the present disclosure, the solid media substrate may be comprised of an acid washed granulated activated carbon (GAC) with pore size, distribution and internal surface area desired for targeted applications. The preferred granulated activated carbon (GAC) is an acid washed lignite based granular activated carbon which is manufactured by NORIT/CABOT and has a mesh size of approximately 8×30. The selective mesh size is determined based on ordinary skill for the target application. The surface acid wash to the NORIT/CABOT Petrodarco 8×30 specification is a critical claim/requirement. In at least some instances, the solid media substrate may be acid washed granular activated carbon (GAC) generated from a lignite coal and especially from the Darco mine in Texas.

The selected media substrate particles used for liquid phase (hydrocarbon or aqueous solutions) may have a particle size from about 8 mesh (2.36 millimeters) to about 30 mesh (0.60 millimeters), or from about 0.50 millimeters to about 2.50 millimeters, or from about 0.75 millimeters to about 2.00 millimeters, or from about 0.75 millimeters to about 1.50 millimeters, or from about 0.85 millimeters to about 1.25 millimeters, or from about 1.00 millimeters to about 2.00 millimeters, or from about 0.60 millimeters to about 1.25 millimeters.

The selected media substrate particles may also have a surface area of from about 250 $m^2/g$ to about 1000 $m^2/g$, or from about 550 $m^2/g$ to about 750 $m^2/g$, or from about 600 $m^2/g$ to about 700 $m^2/g$, or from about 500 $m^2/g$ to about 800 $m^2/g$, or from about 625 $m^2/g$ to about 675 $m^2/g$. The particles may also have a total pore volume from about 0.75 to about 1.15 ml/g, or from about 0.90 to about 1.0 ml/g, or from about 0.85 to about 1.05 ml/g.

It is further understood by one of skill in the art, that other embodiments could be developed using other solid medias with similar surface characteristics as the selected GAC, for the formation of a stable basic iron (III) acetate complex, and such solid medias are with the scope of the present disclosure. It is further understood to one of skill in the art, that other embodiments could include the formation of a stable basic Iron (III) acetate complex bond on other medias, with different surface chemistry properties, selected based on the specific requirements of the application. It is further understood to one of skill in the art, that other embodiments could be developed using other solid medias for the formation of an Iron (III) Acetate complex, that may not form a stable bond to the surface of the media, but would still be functional as a single use product.

Additionally, it is understood that concentration of the stable trinuclear iron (III) ($\mu_3$—O) acetate complex can be increased, where the bonding of the stable trinuclear iron (III) ($\mu_3$—O) acetate complex is performed by completing the multiple, or more than one, bonding, aqueous/alcohol solution removal and curing steps consistent with the teaching of this patent. It is further understood that the molar ratio of the starting and subsequent aqueous/alcohol solutions can be presented at equal or differing molar ratios to achieve the desired concentration of the stable trinuclear iron (III) ($\mu_3$—O) acetate complex.

The presently disclosed porous solid substrate with a bonded iron complex are useful to quantitatively remove polar sulfur compounds, such as mercaptans, from hydrocarbon streams. For example, the presently disclosed compositions and methods may be effective for the retention and removal of butyl mercaptan ($C_4SH$) and larger carbon number mercaptans, which is otherwise difficult to extract from liquid hydrocarbon streams using conventional catalyst/caustic treatments. The presently disclosed compositions may also be used to remove $C_{1-5}SH$ (and higher C number) mercaptans, with butyl mercaptan ($C_4SH$), as a primary example.

In one such embodiment, the presently disclosed porous solid substrate with a bound iron complex, can be used to quantitatively, through oxidation, convert the reactive mercaptan (R—SH) sulfur compounds, into disulfide (R—SS—R) non-reactive hydrocarbon soluble sulfur compounds, without the need of an aqueous caustic phase. For example, the presently disclosed compositions and methods may be effective for the conversion of butyl mercaptan ($C_4H_9SH$) directly into butyl disulfide ($C_8H_{18}S_2$). The presently disclosed compositions may also be used to convert small $C_{1-2}SH$ mercaptans, such as methyl mercaptan ($CH_3SH$) into methyl disulfide ($C_2H_6S_2$) as well as larger kerosene range $C_{6-8}SH$ mercaptans, such as hexyl mercaptans to its disulfide.

Figure 3:
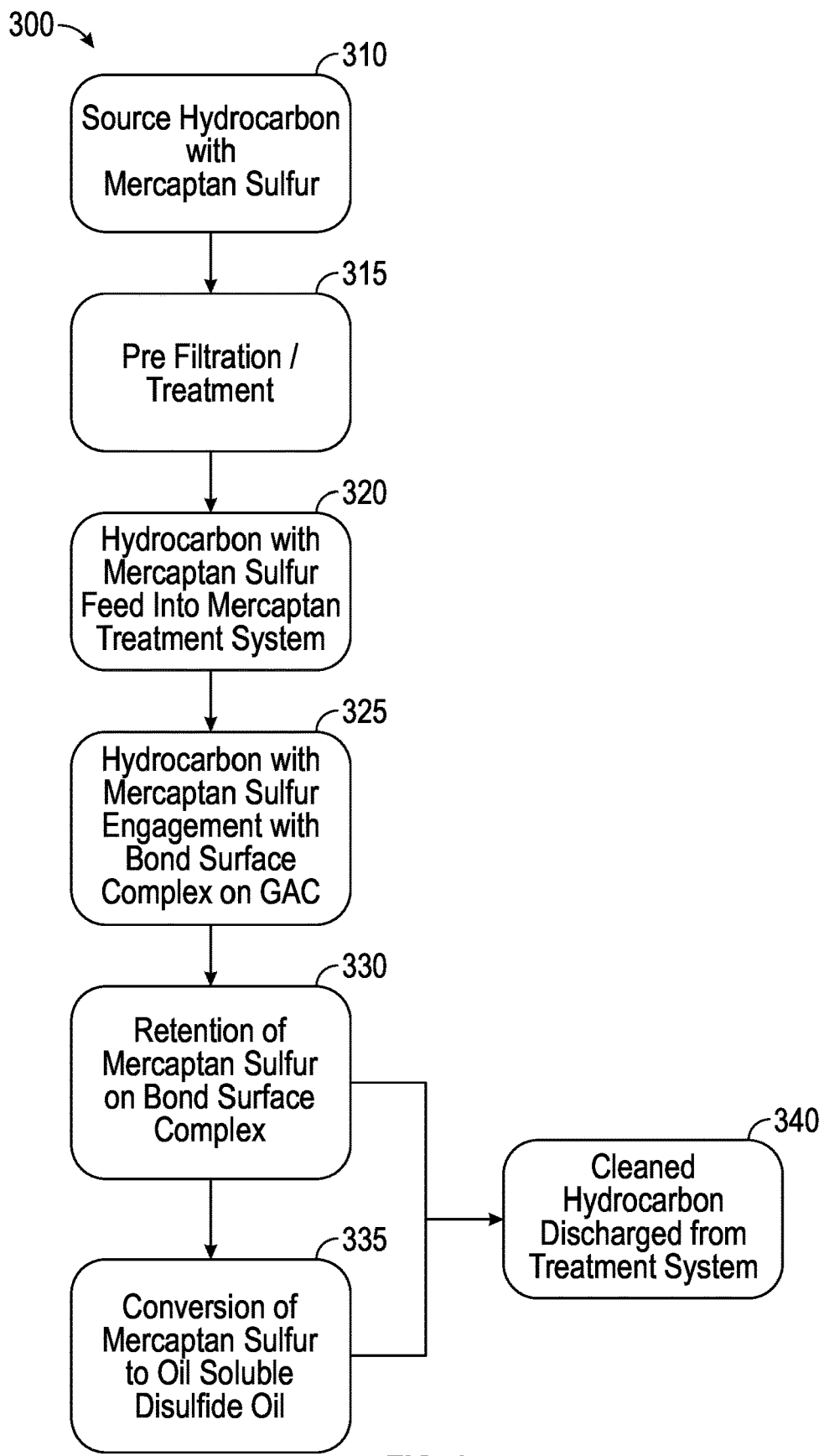
FIG. 3 depicts a simplified process by which the presently disclosed basic iron (III) acetate solid absorbent may be used for the treatment of mercaptan sulfur in a hydrocarbon fluid, according to an exemplary embodiment of the present disclosure.

FIG. 3 depicts a basic simplified process 300 by which the presently disclosed composition comprising a porous solid substrate with a bound iron complex to treat hydrocarbon fluids containing mercaptan sulfur. At 310, a source hydrocarbon stream having mercaptan sulfur is fed into the treatment process 300. Process 300 may optionally include a pre-filtration/treatment step 315 that may be comprised of particulate filtration and/or caustic pre-treatment for the primary purpose of removing solids and hydrogen sulfide. The pre-treatment step 315 may also, in some cases, include bulk separation of any mixed hydrocarbon/aqueous solutions. Pretreatment may be performed to ensure the complex as presently disclosed is not artificially sacrificed by cleansing other contaminates in the hydrocarbon source stream 310.

At 320, the hydrocarbon stream may be fed into a treatment contactor. As the hydrocarbon fluid is introduced into the treatment contactor, the hydrocarbon fluid interacts with the activated carbon having the bond complex at 325 and at least one mercaptan sulfur molecule is retained by the complex 330. The treated hydrocarbon fluid then discharges from the contactor at 340 with at least one mercaptan sulfur molecule removed from the hydrocarbon fluid. At 335, the at least one mercaptan sulfur molecule that is retained by the complex may undergo a conversion to a hydrocarbon soluble disulfide oil, where once the conversion occurs, the disulfide oil will be removed from the complex by the hydrocarbon fluid and exit the contactor as a component of the hydrocarbon fluid. One of skill in the art will understand that the treatment contactor may have many configurations and forms. According to one aspect of the present disclosure, the solid absorbent composition having the bound complex, as presently described herein, may be introduced into the hydrocarbon fluid in particulate form and filtered to remove the complex having bound mercaptan sulfur.

FIG. 4 depicts a treatment system, according to at least one aspect of the present disclosure. As shown in FIG. 4, a hydrocarbon fluid that contains at least one sulfur mercaptan molecule, is fed into a treatment contactor. In at least some instances, the treatment contactor can be a carbon steel constructed vessel. The treatment contactor includes an orifice that is used to direct the flow of the hydrocarbon fluid into the treatment contactor. Within the treatment contactor, some amount of solid media having the bond surface complex, is positioned to come in contact with at least some of the hydrocarbon fluid that has at least one mercaptan sulfur molecule as part of its composition, such that at least one molecule of mercaptan sulfur is retained by the solid media with the bond surface complex allowing for at least some of the treated hydrocarbon fluid to exit the treatment system with reduced or no mercaptan sulfur molecule as part of its composition. Additionally, it may be observed where the retained mercaptan sulfur can be additionally chemically reacted to form an oil soluble disulfide oil, such that the treated hydrocarbon fluid exiting the treatment system may contain a disulfide oil as part of its composition.

Figure 5:
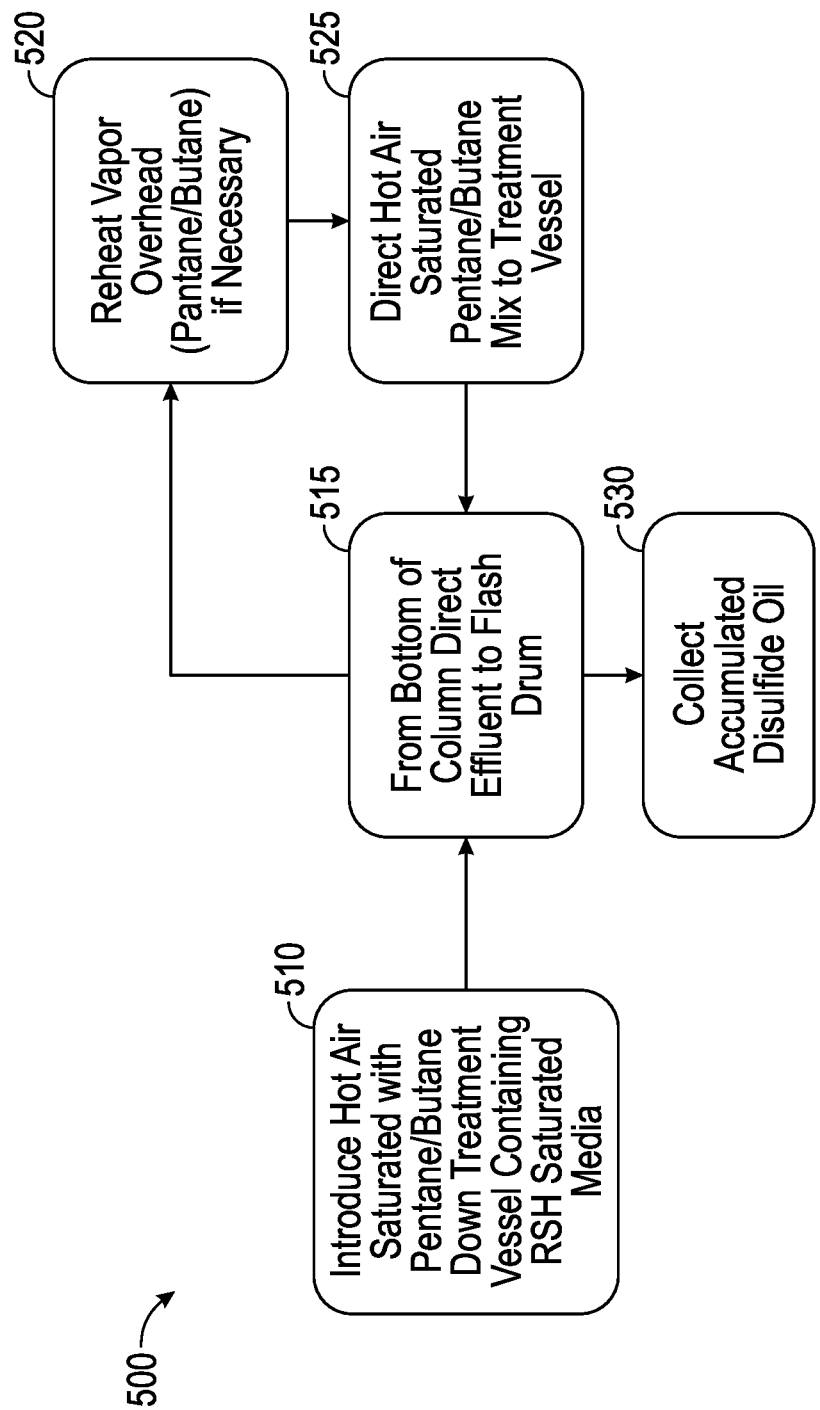
FIG. 5 depicts a process for the regeneration of the complexed solid absorbent, according to an exemplary embodiment of the present disclosure.

FIG. 5 depicts a process 500 for the regeneration of the complexed solid media, according to an embodiment of the present disclosure. In process 500, regeneration is accomplished through off-line R—SH removal through R—SS—R formation. FIG. 5 depicts the general concept of process 500, however, one of skill in the art will recognize that many additional steps may be taken to perform the complete regeneration process. At 510, a treatment vessel that was used for the removal of R—SH and has at least become partially saturated with R—SH to the bound complex within the pores of the media is taken offline, meaning the hydrocarbon stream is stopped and could be directed to a secondary treatment vessel for ongoing treatment. Once "off-line" the treatment vessel is isolated from the hydrocarbon connection. Once the flow is stopped and the vessel is isolated, at 510, hot liquid pentane/butane saturated with air is directed to the top of the treatment vessel where the C4/C5 mixture liquid fills, and therefore, comes into contact with the R—SH that is retained by the bound complex within the media pore surfaces. As the oxygenate liquid mixture comes into contact with the R—SH, the formation of R—SS—R is observed.

At 515, the liquid C4/C5 mixture is discharged from an orifice situated with the lower portion of the vessel. The liquid C4/C5 mixture includes relatively high boiling R—SS—R, until the R—SH is sufficiently removed from the media pore surfaces. The discharged mixture is routed to a flash drum at 530, where the liquid C4/C5 mixture can be separated from the disulfide oil through flash/boiling of the C4/C5 mixture (convert to vapor) leaving the disulfide oil as a residue (530).

At 520, the flashed C4/C5 mixture vapor is condensed and routed back to the top of the treatment vessel 525 where 515, 520 and 525 are continuously repeated until the C4/C5 mixture in 515 is free of disulfide oil. In at least some instances, it may be necessary to reheat 520 the C4/C5 mixture of 515.

Figure 6:
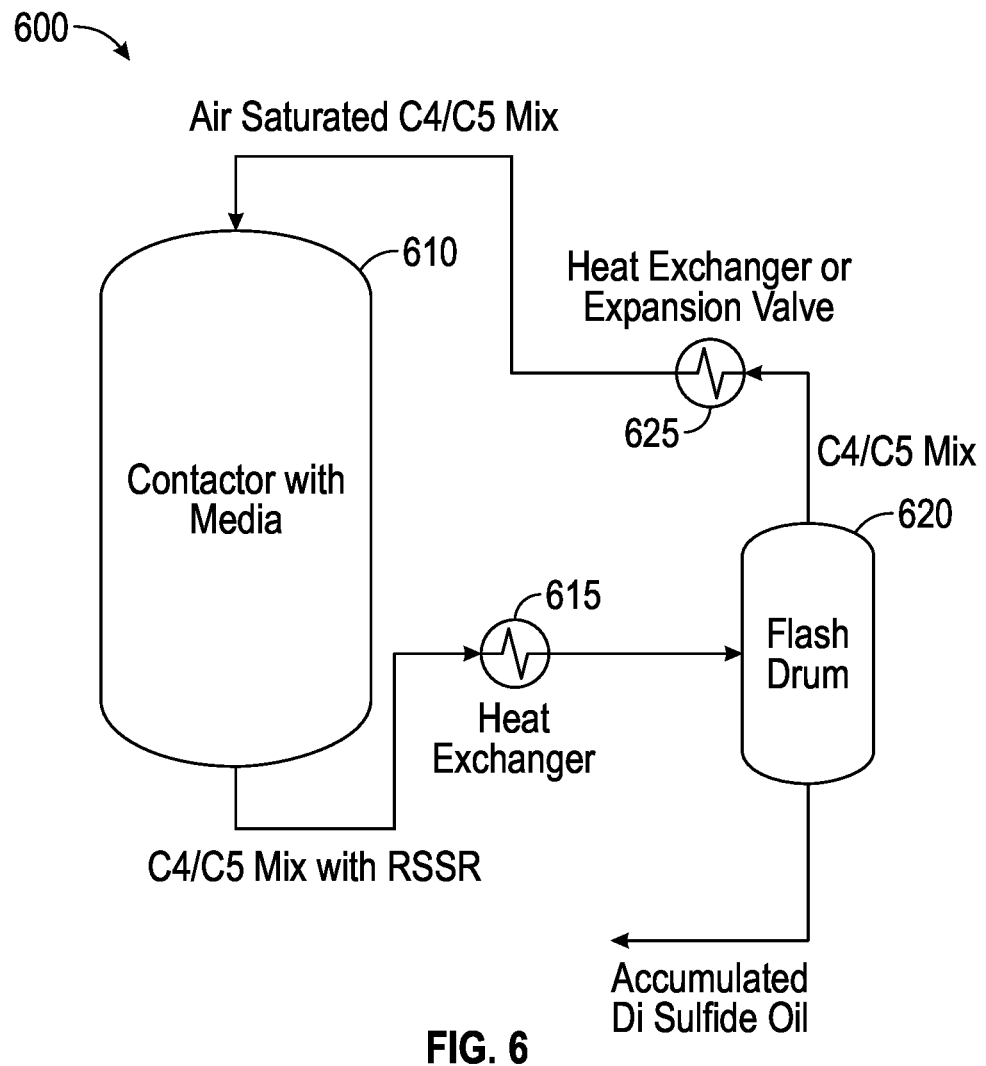
FIG. 6 depicts a further aspect of the process depicted in FIG. 5, according to an exemplary embodiment of the present disclosure.

FIG. 6 depicts a system 600 for the regeneration of the complexed solid media according to process 500 shown in FIG. 5, according to an embodiment of the present disclosure. As shown in FIG. 6, system 600 includes contactor 610. During operation of system 600, the air saturated C4/C5 vapor/condensed liquid is directed to the top of the contactor 610 containing the media with the bound complex within the media pore surfaces. The effluent from the lower portion of the treatment contactor 610 is directed to a heat exchanger 615 and flash drum 620 where sufficient heat is added to flash the C4/C5 mixture. Upon flashing of the light C4/C5 mixture in flash drum 620, the disulfide oil separates and is collected in the boot of the flash drum, and the C4/C5 vapor mixture from the flash drum is condensed by heat exchanger 625 and directed back to the top of the treatment contactor 610. Process 500 utilizing system 600 may continuously be repeated until sufficiently all of the R—SH retained by the bound complex on the pores of the media has been converted to R—SS—R and removed from the media. System 600 may be utilized such that all or some amount of R—SH is removed from the bound complex, to allow for additional extraction and retention of R—SH from a hydrocarbon source onto the bound complex. Those skilled in the art will recognize that many additional steps must be taken to perform the complete regeneration process, and this regeneration step could be performed through different processes.

Importantly, the presently disclosed compositions are effective for the removal of mercaptan sulfur species from hydrocarbons in the absence of the use of alkaline or caustic solutions. In particular, the presently disclosed compositions are capable of retention and removal of sulfur species from hydrocarbon without exposing or saturating the disclosed composition to a caustic solution or aqueous phase to drive the core chemistries. Instead, the sulfur species present in the hydrocarbon interacts directly with the Fe reaction sites of the iron complex bond to the granulated activated carbon (GAC) surface. In particular, the presently disclosed compositions are effective for the retention of mercaptans, especially $C_{2-5}SH$ and larger mercaptans.

Additionally, the presently disclosed compositions are effective for the direct REDOX sweetening of sulfur species from hydrocarbons in the absence of the use of alkaline or caustic solutions, exotic catalysts such as cobalt complexes, or oxygen injection. In particular, the presently disclosed compositions are capable of the donation of electrons from trinuclear iron (III) ($\mu_3$—O) acetate complex to the R—SH compounds in order to directly form R—SS—R compounds without exposing or saturating the disclosed composition to a caustic solution or aqueous phase to drive the core chemistries. Instead, the sulfur species present in the hydrocarbon or aqueous solutions interacts directly with the Fe reaction sites of the iron complex bound to the granulated activated carbon surface. In particular, the presently disclosed compositions are effective for the sweetening of mercaptans, especially $C_{1-5}SH$ or higher carbon number mercaptans.

Furthermore, the presently disclosed compositions provide surface-fixed complexed iron active sites for the removal or sweetening of mercaptan sulfur species from hydrocarbon streams rather than the use of soluble chelated (organic molecule complexed) iron to react with sulfur species. Therefore, the presently disclosed compositions may be used in the form of a stationary bed for the treatment of hydrocarbon phases having mercaptan sulfur compounds.

Statements of the Disclosure

Statement 1: A composition for the removal and/or reaction of one or more mercaptan sulfur compounds from a hydrocarbon fluid stream, the composition comprising: a porous solid media comprising a bound stable basic iron (III) acetate complex bonded to a surface of a porous solid media, wherein the bound stable basic iron (III) acetate complex comprises a $[Fe_3(\mu_3—O)]$ core structure.

Statement 2: The composition according to Statement 1, wherein the bound stable basic iron (III) acetate complex comprises a $[Fe^{+3}_3(\mu\text{-}O)(OAc^-)_6]$triangle complex and/or a reduced $[Fe^{+3}_2Fe^{+2}(\mu\text{-}O)(OAc^-)_6]$triangle complex, and wherein the triangle complex and/or the reduced triangle complex remain intact and retain their chemical structure and related chemical activity during reaction with mercaptan sulfur and are not deactivated by other sulfur or oxygen compounds.

Statement 3: The composition according to Statement 1 or Statement 2, wherein the porous solid media comprises one or more internal pore surfaces, and wherein the bound stable basic iron (III) acetate complex is bonded to the one or more internal pore surfaces.

Statement 4: The composition according to any one of the preceding Statements 1-3, wherein the porous solid media comprises one or more porous granulated activated carbon (GAC) particles.

Statement 5: The composition according to any one of the preceding Statements 1-4, wherein the porous solid media is acid washed lignite coal based activated carbon.

Statement 6: The composition according to any one of the preceding Statements 1-5, wherein the porous solid media comprises particles having a particle size of from about 0.50 millimeters to about 2.50 millimeters.

Statement 7: The composition according to any one of the preceding Statements 1-6, wherein the porous solid media comprises particles having a surface area of from about 250 $m^2/g$ to about 1000 $m^2/g$.

Statement 8: The composition according to any one of the preceding Statements 1-7, wherein the porous solid media comprises particles having a total pore volume from about 0.75 to about 1.15 ml/g.

Statement 9: The composition according to any one of the preceding Statements 1-8, wherein the bound stable basic iron (III) acetate complex is formed as a soluble cation in solution, delivered to the selected media pore surface with a mixed alcohol/acidic aqueous solution and bonded within the pore surface of the porous solid media through staged solvent removal and thermal curing.

Statement 10: The composition according to Statement 9, wherein the bound stable basic iron (III) acetate complex is formed from an iron (III) nitrate hydrate ($Fe_3(NO_3)_3$-$9H_2O$) starting material, and wherein the nitrate anion present in the starting material is decomposed to nitrous oxide ($NO_2$) gas removal during the thermal curing.

Statement 11: The composition according to Statement 9, wherein the bound stable basic iron (III) acetate complex is formed in an aqueous solution of iron (III) nitrate hydrate [$Fe(NO_3^-)_3$-$9H_2O$] and glacial acetic acid ($CH_3COOH$) at ratios consistent with the complex composition.

Statement 12: The composition according to Statement 9, wherein bound stable basic iron (III) acetate complex is formed in a solution comprising a mixture of water and alcohol to achieve a high dispersion of mixture within the pores of the porous solid media.

Statement 13: The composition according to Statement 9, wherein bound stable basic iron (III) acetate complex is formed in a solution comprising a mixture of water and alcohol to achieve a high degree of pore surface wetting facilitating uniform distribution of complex over the surface of the selected porous solid media.

Statement 14: The composition according to Statement 12, wherein the aqueous/alcohol solution is removed in stages resulting in the intact complex being dispersed and chemically bound to the porous solid media surface.

Statement 15: The composition according to Statement 14, wherein once the aqueous/alcohol solution is removed, a final heating/curing step is performed to chemically bind the complex to the pore surface of porous solid media.

Statement 16: The composition according to Statement 15, wherein the stable basic iron (III) acetate complex is formed by the presentation of more than one mixture solutions the associated aqueous/alcohol solution removal stages and final heating/curing stages, to achieve increased concentrations of Basic Iron (III) Acetate complex formation.

Statement 17: The composition according to any one of Statements 1-16, wherein the composition is utilized in a fixed bed or a fluidized bed absorber.

Statement 18: The composition according to any one of Statements 2-17, wherein the composition, when in the presence of mercaptan sulfur observes a conversion of mercaptan sulfur to disulfides, utilizing previously characterized $Fe^{+2/+3}$ redox cycle of the [$Fe^{+3}_3(\mu$-$O)$]triangle when bonded to the porous solid media without a caustic phase.

Statement 19: The composition according to any one of Statements 2-17, wherein the [$Fe^{+3}_3(\mu$-$O)$]triangle chemical activity can be regenerated and the core complex chemistry retained through oxidation of any retained mercaptans to hydrocarbon phase soluble disulfides.

Statement 20: The composition according to Statement 19, wherein the regeneration can be performed using soluble oxygen and a recyclable light (low boiling) hydrocarbon solvent.

Statement 21: A method for treating a hydrocarbon fluid stream comprising one or more mercaptans, the method comprising: contacting a hydrocarbon fluid stream comprising mercaptan sulfur R—SH with a composition, the composition comprising: a porous solid media comprising a bound stable basic iron (III) acetate complex bonded to a surface of a porous solid media, wherein the bound stable basic iron (III) acetate complex comprises a [$Fe_3(\mu_3$—$O)$] core structure; and causing at least a portion of the mercaptan sulfur R—SH to be retained on an iron (Fe) site of the core structure.

Statement 22: The method according to Statement 21, wherein the hydrocarbon fluid stream comprises one or more components selected from the group consisting of propane, butane, mixtures of propane and butane, hydrocarbon condensate, light and heavy naphtha, kerosene, jet fuel, natural gasoline, and any combination thereof.

Statement 23: The method according to Statement 21 or Statement 22, wherein the bound stable basic iron (III) acetate complex comprises a [$Fe^{+3}_3(\mu$-$O)(OAc^-)_6$]triangle complex and/or a reduced [$Fe^{+3}_2Fe^{+2}(\mu$-$O)(OAc^-)_6$]triangle complex, and wherein the triangle complex and/or the reduced triangle complex remain intact and retain their chemical structure and related chemical activity during reaction with mercaptan sulfur and are not deactivated by other sulfur or oxygen compounds.

Statement 24: The method according to any one of the preceding Statements 21-23, wherein the porous solid media comprises one or more internal pore surfaces, and wherein the bound stable basic iron (III) acetate complex is bonded to the one or more internal pore surfaces.

Statement 25: The method according to any one of the preceding Statements 21-24, wherein the porous solid media comprises one or more porous granulated activated carbon (GAC) particles.

Statement 26: The method according to any one of the preceding Statements 21-25, wherein the porous solid media is acid washed lignite coal based activated carbon.

Statement 27: The method according to any one of the preceding Statements 21-26, wherein the porous solid media comprises particles having a particle size of from about 0.50 millimeters to about 2.50 millimeters.

Statement 28: The method according to any one of the preceding Statements 21-27, wherein the porous solid media comprises particles having a surface area of from about 250 $m^2/g$ to about 1000 $m^2/g$.

Statement 29: The method according to any one of the preceding Statements 21-28, wherein the porous solid media comprises particles having a total pore volume from about 0.75 to about 1.15 ml/g.

Statement 30: The method according to any one of the preceding Statements 21-29, wherein contacting a hydrocarbon fluid stream comprises causing the hydrocarbon fluid stream to flow into the pores and channels of the porous solid media substrate whereby the mercaptan sulfur compounds interact with the non-surface bound $Fe^{+3}$ sites of the [$Fe^{+3}_3(\mu$-$O)$]triangle, where the R—SH is initially retained on an Fe site on the pore surface within the porous solid media.

Statement 31: The method according to Statement 30, wherein retention of R—SH by the [$Fe^{+3}_3(\mu$-$O)$]triangle complex on the pore surface of the porous solid media is observed to be quantitative, no disulfide formation, up to a 1:1 iron:sulfur Molar ratio with increasing ratios of R—SS—R formation a compared to R—SH retention or compared to a molar ratios approach 1:2.

Statement 32: The method according to Statement 30, wherein oxidation conversion of R—SH into R—SS—R initially occurs at an iron:sulfur molar ration of at least 1:1, and becomes quantitative on a continuous basis as the molar load reaches 1:2.

Statement 33: The method according to Statement 32, wherein the R—SS—R is an oil soluble disulfide oil, the method further comprising removal of the R—SS—R as a soluble non-reactive component within the hydrocarbon fluid stream.

Statement 34: The method according to any one of the preceding Statements 21-33, wherein the mercaptan sulfur R—SH can be straight chain or branched mercaptans with targeted carbon chains in the C1-C8 range for retention and sweetening and higher carbon number (kerosene range) mercaptans targeted for quantitative sweetening.

Statement 35: The method according to any one of preceding Statements 21-34, wherein the hydrocarbon fluid stream comprises at least one selected from the group consisting of pressurized propane, pressurized butane, pressurized isobutane (ambient boiling point range of −42 C-12 C), un-stabilized/pressurized Y-condensate (ambient boiling point range of −42 C to 150 C), stabilized natural gasoline (ambient boiling point range of 30 C to 250 C), light gas oil/kerosene/turbine fuel (ambient boiling point range of 150 C-300 C), and any combination or mixture thereof.

Statement 36: The method according to any one of the preceding Statements 21-35, further comprising: pre-treating the hydrocarbon fluid stream using aqueous caustic to extract hydrogen sulfide and methyl thiol.

Statement 37: The method according to Statement 36, wherein the aqueous caustic comprises a sodium hydroxide aqueous solution.

Statement 38: The method according to any one of the preceding Statements 21-37, further comprising: pre-treating the hydrocarbon fluid stream using particulate filtration.

Statement 39: The method according to any one of the preceding Statements 21-38, further comprising: performing a recycle step comprising: passing a light oxygenated hydrocarbon (pentane/butane) through a R—SH saturated treatment vessel thereby converting retained R—SH to soluble R—SS—R; heating the eluted wash solvent/R—SS—R mixture such that the solvent flashes and the R—SS—R is condensed; condensing the flashed solvent at the top of the treatment vessel allowing the "hot" solvent to continue removal of retained R—SH; and repeating the recycle step until the eluded solvent is free of R—SS—R.

Statement 40: The method according to Statement 39, wherein the recycle step includes the use of heat or steam.

Statement 41: The method according to any one of the preceding Statements 21-40, further comprising pre-treating the hydrocarbon fluid stream with heat or steam so as to decrease the viscosity of the hydrocarbon fluid stream before contacting the hydrocarbon fluid stream with the composition.

Statement 42: A system for treating a hydrocarbon fluid stream comprising one or more mercaptans, the system comprising: a treatment contactor, the treatment contactor comprising a porous solid media composition comprising a bound stable basic iron (III) acetate complex bonded to a surface of a porous solid media, wherein the bound stable basic iron (III) acetate complex comprises a $[Fe_3(\mu_3—O)]$ core structure; wherein the treatment contactor is operable to receive a hydrocarbon fluid stream in need of treatment and cause the hydrocarbon fluid stream to be contacted with the composition.

Statement 43: The system according to Statement 42, further comprising a flash drum in fluid communication with the treatment contactor, the flash drum operable to receive effluent from a lower portion of the treatment contactor and cause the effluent to be sufficiently heated so as to flash the effluent, or a portion thereof, to generate a flashed effluent portion and thereby causing the disulfide oil to separate and collect at a boot of the flash drum.

Statement 44: The system according to Statement 43, further comprising a first heat exchanger in fluid communication with the flash drum and the treatment contactor, wherein the first heat exchanger is operable to receive the flashed effluent portion from the flash drum and remove heat from the flashed effluent portion so as to cause the condensation of the flashed effluent portion to form a condensed effluent.

Statement 45: The system according to Statement 44, wherein the treatment contactor is further operable to receive the condensed effluent from the heat exchanger.

Statement 46: The system according to Statement 45, further comprising a second heat exchanger for sufficiently heating the effluent so as to flash the effluent or a portion thereof in the flash drum.

Statement 47: The system according to any one of the preceding Statements 42-46, wherein the treatment contactor comprises a fixed bed or a fluidized bed absorber comprising the porous solid media composition.

Statement 48: The system according to any one of the preceding Statements 42-47, wherein the treatment contactor comprises a packed bed comprising the porous solid media composition.

Statement 49: The system according to any one of the preceding Statements 42-48, wherein the treatment contactor comprises a fluidized bed comprising the porous solid media composition.

Statement 50: The system according to Statement 46, comprising a plurality of treatment contactors, thereby allowing for the continuous treatment of the hydrocarbon fluid stream.

Statement 51: The system according to Statement 50, wherein the system is operable to perform a concurrent regeneration step whereby the flow of the hydrocarbon fluid stream is stopped at a first treatment contactor where retention of R—SH had occurred is isolation, and re-directed to a second treatment contactor having a fresh or recycled porous solid media composition.

Statement 52: The system according to any one of the preceding Statements 42-51, wherein the bound stable basic iron (III) acetate complex comprises a $[Fe^{+3}_3(\mu\text{-O})(OAc^-)_6]$ triangle complex and/or a reduced $[Fe^{+3}_2Fe^{+2}(\mu\text{-O})(OAc^-)_6]$ triangle complex, and wherein the triangle complex and/or the reduced triangle complex remain intact and retain their chemical structure and related chemical activity during reaction with mercaptan sulfur and are not deactivated by other sulfur or oxygen compounds.

Statement 53: The system according to any one of the preceding Statements 42-52, wherein the porous solid media comprises one or more internal pore surfaces, and wherein the bound stable basic iron (III) acetate complex is bonded to the one or more internal pore surfaces.

Statement 54: The system according to any one of the preceding Statements 42-53, wherein the porous solid media comprises one or more porous granulated activated carbon (GAC) particles.

Statement 55: The system according to any one of the preceding Statements 42-54, wherein the porous solid media is acid washed lignite coal based activated carbon.

Statement 56: The system according to any one of the preceding Statements 42-55, wherein the porous solid media comprises particles having a particle size of from about 0.50 millimeters to about 2.50 millimeters.

Statement 57: The system according to any one of the preceding Statements 42-56, wherein the porous solid media comprises particles having a surface area of from about 250 m²/g to about 1000 m²/g.

Statement 58: The system according to any one of the preceding Statements 42-57, wherein the porous solid media comprises particles having a total pore volume from about 0.75 to about 1.15 ml/g.

Statement 59: The system according to Statement 52, wherein the treatment contactor further comprises a distribution/diffusion mechanism to cause the flow of the hydrocarbon fluid stream into the pores and channels of the porous solid media whereby the mercaptan sulfur compounds interact with the non-surface bound $Fe^{+3}$ sites of the $[Fe^{+3}{}_3(\mu\text{-}O)]$triangle, where the R—SH is initially retained on an Fe site on the pore surface within the porous solid media.

What is claimed is:

1. A composition for the removal and/or reaction of one or more mercaptan sulfur compounds from a hydrocarbon fluid stream, the composition comprising:
 a porous solid media comprising a bound stable basic iron (III) acetate complex bonded to a surface of the porous solid-carbon-based media, and wherein the bound stable basic iron (III) acetate complex comprises a $[Fe_3(\mu_3\text{—}O)]$ core structure.

2. The composition according to claim 1, wherein the bound stable basic iron (III) acetate complex comprises a $[Fe^{+3}{}_3(\mu\text{-}O)(OAc^-)_6]$triangle complex and/or a reduced $[Fe^{+3}{}_2Fe^{+2}(\mu\text{-}O)(OAc^-)_6]$triangle complex, wherein "$OAc^-$" is an acetate anion, and wherein the triangle complex and/or the reduced triangle complex remain intact and retain their chemical structure and related chemical activity during reaction with mercaptan sulfur and are not deactivated by other sulfur or oxygen compounds.

3. The composition according to claim 1, wherein the porous solid media comprises one or more internal pore surfaces, and wherein the bound stable basic iron (III) acetate complex is bonded to the one or more internal pore surfaces.

4. The composition according to claim 1, wherein the porous solid media comprises one or more porous granulated activated carbon (GAC) particles.

5. The composition according to claim 1, wherein the porous solid media is acid washed lignite coal based activated carbon.

6. The composition according to claim 1, wherein the porous solid media comprises particles having a particle size of from about 0.50 millimeters to about 2.50 millimeters.

7. The composition according to claim 1, wherein the porous solid media comprises particles having a surface area of from about 250 m²/g to about 1000 m²/g.

8. The composition according to claim 1, wherein the porous solid media comprises particles having a total pore volume from about 0.75 to about 1.15 ml/g.

9. The composition according to claim 1, wherein the bound stable basic iron (III) acetate complex is formed as a soluble cation in solution, delivered to the selected media pore surface with a mixed alcohol/acidic aqueous solution and bonded within the pore surface of the porous solid media through staged solvent removal and thermal curing.

10. The composition according to claim 9, wherein the bound stable basic iron (III) acetate complex is formed from an iron (III) nitrate hydrate $(Fe_3(NO_3)_3\text{-}9H_2O)$ starting material, and wherein the nitrate anion present in the starting material is decomposed to nitrous oxide ($NO_2$) gas removal during the thermal curing.

11. The composition according to claim 9, wherein the bound stable basic iron (III) acetate complex is formed in an aqueous solution of iron (III) nitrate hydrate $[Fe(NO_3^-)_3\text{-}9H_2O]$ and glacial acetic acid ($CH_3COOH$) at ratios consistent with the complex composition.

12. The composition according to claim 9, wherein bound stable basic iron (III) acetate complex is formed in a solution comprising a mixture of water and alcohol to achieve a high dispersion of mixture within the pores of the porous solid media.

13. The composition according to claim 9, wherein bound stable basic iron (III) acetate complex is formed in a solution comprising a mixture of water and alcohol to achieve a high degree of pore surface wetting facilitating uniform distribution of complex over the surface of the selected porous solid media.

14. The composition according to claim 12, wherein the aqueous/alcohol solution is removed in stages resulting in the intact complex being dispersed and chemically bound to the porous solid media surface.

15. The composition according to claim 14, wherein once the aqueous/alcohol solution is removed, a final heating/curing step is performed to chemically bind the complex to the pore surface of porous solid media.

16. The composition according to claim 15, wherein the stable basic iron (III) acetate complex is formed by the presentation of more than one mixture solutions the associated aqueous/alcohol solution removal stages and final heating/curing stages, to achieve increased concentrations of basic iron (III) acetate complex formation.

17. The composition according to claim 1, wherein the composition is utilized in a fixed bed or a fluidized bed absorber.

18. The composition according to claim 2, wherein the composition, when in the presence of mercaptan sulfur observes a conversion of mercaptan sulfur to disulfides, utilizing previously characterized $Fe^{+2/+3}$ redox cycle of the $[Fe^{+3}{}_3(\mu\text{-}O)]$triangle when bonded to the porous solid media without a caustic phase.

19. The composition according to claim 2, wherein the $[Fe^{+3}{}_3(\mu\text{-}O)]$triangle chemical activity can be regenerated and the core complex chemistry retained through oxidation of any retained mercaptans to hydrocarbon phase soluble disulfides.

20. The composition according to claim 19, wherein the regeneration can be performed using soluble oxygen and a recyclable light (low boiling) hydrocarbon solvent.

21. A method for treating a hydrocarbon fluid stream comprising one or more mercaptans, the method comprising:
 contacting a hydrocarbon fluid stream comprising mercaptan sulfur R—SH with a composition, the composition comprising:
  a porous solid media comprising a bound stable basic iron (III) acetate complex bonded to a surface of a porous solid media,
  wherein the bound stable basic iron (III) acetate complex comprises a $[Fe_3(\mu_3\text{—}O)]$ core structure; and
 causing at least a portion of the mercaptan sulfur R—SH to be retained on an iron (Fe) site of the core structure.

22. The method according to claim 21, wherein the hydrocarbon fluid stream comprises one or more components selected from the group consisting of propane, butane, mixtures of propane and butane, hydrocarbon condensate, light and heavy naphtha, kerosene, jet fuel, natural gasoline, and any combination thereof.

23. The method according to claim 22, wherein the bound stable basic iron (III) acetate complex comprises a $[Fe^{+3}_3(\mu\text{-}O)(OAc^-)_6]$triangle complex and/or a reduced $[Fe^{+3}_2Fe^{+2}(\mu\text{-}O)(OAc^-)_6]$triangle complex, wherein "$OAc^-$" is an acetate anion, and wherein the triangle complex and/or the reduced triangle complex remain intact and retain their chemical structure and related chemical activity during reaction with mercaptan sulfur and are not deactivated by other sulfur or oxygen compounds.

24. The method according to claim 21, wherein the porous solid media comprises one or more internal pore surfaces, and wherein the bound stable basic iron (III) acetate complex is bonded to the one or more internal pore surfaces.

25. The method according to claim 21, wherein the porous solid media comprises one or more porous granulated activated carbon (GAC) particles.

26. The method according to claim 21, wherein the porous solid media is acid washed lignite coal based activated carbon.

27. The method according to claim 21, wherein the porous solid media comprises particles having a particle size of from about 0.50 millimeters to about 2.50 millimeters.

28. The method according to claim 21, wherein the porous solid media comprises particles having a surface area of from about 250 m²/g to about 1000 m²/g.

29. The method according to claim 21, wherein the porous solid media comprises particles having a total pore volume from about 0.75 to about 1.15 ml/g.

30. The method according to claim 23, wherein contacting a hydrocarbon fluid stream comprises causing the hydrocarbon fluid stream to flow into the pores and channels of the porous solid media substrate whereby the mercaptan sulfur compounds interact with the non-surface bound $Fe^{+3}$ sites of the $[Fe^{+3}_3(\mu\text{-}O)]$triangle, where the R—SH is initially retained on an Fe site on the pore surface within the porous solid media.

31. The method according to claim 30, wherein retention of R—SH by the $[Fe^{+3}_3(\mu\text{-}O)]$triangle complex on the pore surface of the porous solid media is observed to be quantitative, no disulfide formation, up to a 1:1 iron:sulfur molar ratio with increasing ratios of R—SS—R formation compared to R—SH retention or compared to a molar ratios approach 1:2.

32. The method according to claim 30, wherein oxidation conversion of R—SH into R—SS—R initially occurs at an iron:sulfur molar ratio of at least 1:1, and becomes quantitative on a continuous basis as the molar load reaches 1:2.

33. The method according to claim 32, wherein the R—SS—R is an oil soluble disulfide oil, the method further comprising removal of the R—SS—R as a soluble non-reactive component within the hydrocarbon fluid stream.

34. The method according to claim 21, wherein the mercaptan sulfur R—SH can be straight chain or branched mercaptans with targeted carbon chains in the C1-C8 range for retention and sweetening and higher carbon number (kerosene range) mercaptans targeted for quantitative sweetening.

35. The method according to claim 21, wherein the hydrocarbon fluid stream comprises at least one selected from the group consisting of pressurized propane, pressurized butane, pressurized isobutane (ambient boiling point range of −42° C.-12° C.), un-stabilized/pressurized Y-condensate (ambient boiling point range of −42° C. to 150° C.), stabilized natural gasoline (ambient boiling point range of 30° C. to 250° C.), light gas oil/kerosene/turbine fuel (ambient boiling point range of 150° C.-300° C.), and any combination or mixture thereof.

36. The method according to claim 21, further comprising:
pre-treating the hydrocarbon fluid stream using aqueous caustic to extract hydrogen sulfide and methyl thiol.

37. The method according to claim 36, wherein the aqueous caustic comprises a sodium hydroxide aqueous solution.

38. The method according to claim 21, further comprising:
pre-treating the hydrocarbon fluid stream using particulate filtration.

39. The method according to claim 21, further comprising:
performing a recycle step comprising:
passing a light oxygenated hydrocarbon (pentane/butane) through a R—SH saturated treatment vessel thereby converting retained R—SH to soluble R—SS—R,
heating the eluted wash solvent/R—SS—R mixture such that the solvent flashes and the R—SS—R is condensed;
condensing the flashed solvent at the top of the treatment vessel allowing the "hot" solvent to continue removal of retained R—SH; and
repeating the recycle step until the eluded solvent is free of R—SS—R.

40. The method according to claim 39, wherein the recycle step includes the use of heat or steam.

41. The method according to claim 21, further comprising pre-treating the hydrocarbon fluid stream with heat or steam so as to decrease the viscosity of the hydrocarbon fluid stream before contacting the hydrocarbon fluid stream with the composition.

42. A system for treating a hydrocarbon fluid stream comprising one or more mercaptans, the system comprising:
a treatment contactor, the treatment contactor comprising a porous solid media composition comprising a bound stable basic iron (III) acetate complex bonded to a surface of a porous carbon-based media, wherein the bound stable basic iron (III) acetate complex comprises a $[Fe_3(\mu_3\text{—}O)]$ core structure; and
wherein the treatment contactor is operable to receive a hydrocarbon fluid stream in need of treatment and cause the hydrocarbon fluid stream to be contacted with the composition.

43. The system according to claim 42, further comprising a flash drum in fluid communication with the treatment contactor, the flash drum operable to receive effluent from a lower portion of the treatment contactor and cause the effluent to be sufficiently heated so as to flash the effluent, or a portion thereof, to generate a flashed effluent portion and thereby causing the disulfide oil to separate and collect at a boot of the flash drum.

44. The system according to claim 43, further comprising a first heat exchanger in fluid communication with the flash drum and the treatment contactor, wherein the first heat exchanger is operable to receive the flashed effluent portion from the flash drum and remove heat from the flashed effluent portion so as to cause the condensation of the flashed effluent portion to form a condensed effluent.

45. The system according to claim 44, wherein the treatment contactor is further operable to receive the condensed effluent from the heat exchanger.

46. The system according to claim 45, further comprising a second heat exchanger for sufficiently heating the effluent so as to flash the effluent or a portion thereof in the flash drum.

47. They system according to claim 42, wherein the treatment contactor comprises a fixed bed or a fluidized bed absorber comprising the porous solid media composition.

48. They system according to claim 42, wherein the treatment contactor comprises a packed bed comprising the porous solid media composition.

49. They system according to claim 42, wherein the treatment contactor comprises a fluidized bed comprising the porous solid media composition.

50. They system according to claim 46, comprising a plurality of treatment contactors, thereby allowing for the continuous treatment of the hydrocarbon fluid stream.

51. The system according to claim 50, wherein the system is operable to perform a concurrent regeneration step whereby the flow of the hydrocarbon fluid stream is stopped at a first treatment contactor where retention of R—SH had occurred in isolation, and re-directed to a second treatment contactor having a fresh or recycled porous solid media composition.

52. The system according to claim 42, wherein the bound stable basic iron (III) acetate complex comprises a $[Fe^{+3}_3(\mu\text{-O})(OAc^-))_6]$triangle complex and/or a reduced $[Fe^{+3}_2 Fe^{+2}(\mu\text{-O})(OAc^-))_6]$triangle complex, wherein "OAc⁻" is an acetate anion, and wherein the triangle complex and/or the reduced triangle complex remain intact and retain their chemical structure and related chemical activity during reaction with mercaptan sulfur and are not deactivated by other sulfur or oxygen compounds.

53. The system according to claim 42, wherein the porous solid media comprises one or more internal pore surfaces, and wherein the bound stable basic iron (III) acetate complex is bonded to the one or more internal pore surfaces.

54. The system according to claim 42, wherein the porous solid media comprises one or more porous granulated activated carbon (GAC) particles.

55. The system according to claim 42, wherein the porous solid media is acid washed lignite coal based activated carbon.

56. The system according to claim 42, wherein the porous solid media comprises particles having a particle size of from about 0.50 millimeters to about 2.50 millimeters.

57. The system according to claim 42, wherein the porous solid media comprises particles having a surface area of from about 250 m²/g to about 1000 m²/g.

58. The system according to claim 42, wherein the porous solid media comprises particles having a total pore volume from about 0.75 to about 1.15 ml/g.

59. The system according to claim 52, wherein the treatment contactor further comprises a distribution/diffusion mechanism to cause the flow of the hydrocarbon fluid stream into the pores and channels of the porous solid media whereby the mercaptan sulfur compounds interact with the non-surface bound $Fe^{+3}$ sites of the $[Fe^{+3}_3(\mu\text{-O})]$triangle, where the R—SH is initially retained on an Fe site on the pore surface within the porous solid media.

* * * * *